April 29, 1924.
D. W. GUILES
1,492,322
SOIL PIPE FITTING
Filed March 21, 1923
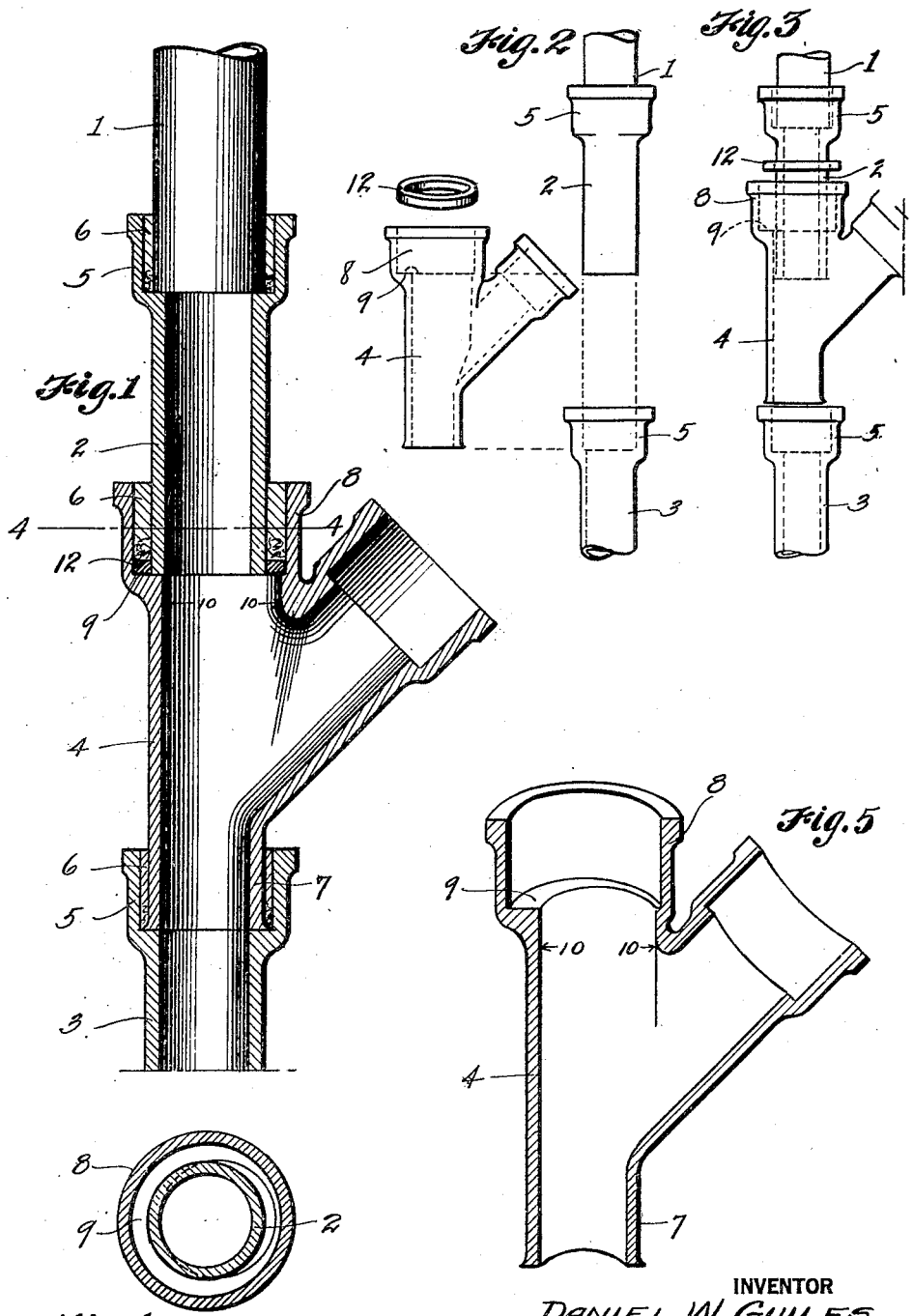
INVENTOR
DANIEL W. GUILES
BY
Richard J. Cook
ATTORNEY Patented Apr. 29, 1924.

1,492,322

UNITED STATES PATENT OFFICE.

DANIEL W. GUILES, OF SEATTLE, WASHINGTON.

SOIL-PIPE FITTING.

Application filed March 21, 1923. Serial No. 626,538.

*To all whom it may concern:*

Be it known that I, DANIEL W. GUILES, a citizen of the United States, and a resident of Seattle, King County, Washington, have invented certain new and useful Improvements in Soil-Pipe Fittings, of which the following is a specification.

This invention relates to improvements in soil pipe fittings, and more particularly to T and Y branch fittings, especially constructed for use where the fitting is to be cut into an already existing stack, or vent pipe, as distinguished from fittings of that type that are placed in the stack, or vent, at the time of its erection.

It is often necessary or desirable when altering, remodeling or repairing buildings to install plumbing fixtures and to connect these with already existing stacks or vents, and here-to-fore one of the principal objections to making such connections has been that it weakens that part of the stack above the point of connection, this being due to the fact that an inserted fitting of the same length as the piece removed could not be applied but necessarily a shorter one had to be used in order to permit the parts to be joined.

Therefore, the object of this invention has been to provide a fitting for the above stated purpose that is so constructed that, after being applied to or inserted within a stack, it will serve as a means of support for that part above the inserted fitting.

More specifically, the object of the invention resides in the provision of a fitting that may be inserted within a stack and wherein the upper end of the opening therethrough is of sufficient diameter as to receive therein the end of the pipe to which the fitting is applied, and to provide an eccentric hub about this end to thereby form a shoulder on which the end of the piece to which the fitting is applied may be seated for support.

Another object resides in the provision of a centering ring for retaining the upper section on the shoulder.

Other objects of the invention reside in the various details of construction and combination of parts embodied in the invention and in the manner of assembling the parts with a stack.

In accomplishing these and other objects, I have provided the improved details of construction, the preferred forms of which are illustrated in the accompanying drawings, wherein—

Figure 1 is a vertical, sectional view of a portion of a stack wherein a Y fitting embodying the present invention is inserted.

Figure 2 is a view illustrating the first step preparatory to inserting a fitting within a stack.

Figure 3 is a similar view illustrating a farther step in assembling the parts.

Figure 4 is a horizontal section, taken on the line 4—4 in Figure 1.

Figure 5 is a sectional, perspective view of a fitting embodying the present invention.

Referring more in detail to the drawings:

1, 2 and 3, respectively, designate sections of a stack or vent pipe, and 4 a Y fitting, of a type embodying the present invention, that is inserted therein. Each pipe section of the stack has a straight lower end that is fitted within a hub portion 5 formed on the upper end of the next lower section, and the hub joints are sealed in a suitable manner, as by the lead calking 6.

The lower end portion 7 of the fitting 4 is of the same outside diameter as the stack sections 1, 2 and 3 in order that it may be joined properly within a hub 5 of any of these sections. At its upper end the fitting is provided with a hub 8 that is concentric with respect to the lower end 7, but which is formed eccentrically with respect to the opening at the upper end of the pipe proper, and thereby forms an annular shoulder 9 that is of narrow width at one side, but which is relatively wide at the other side, as is best shown in Figure 5.

The inner diameter of the pipe opening into the hub 8, as between the points 10—10. in Figure 5, is greater than the diameter of the lower end, it being slightly greater than the outside diameter of the stack sections in order that the lower end of a section to which the fitting is to be joined may be slipped into it at least a distance equal to the depth of a hub.

When it is desired to insert a fitting of this type in a stack, the process would be carried out as illustrated in Figures 2 and 3, which will be described as follows:

First, a piece of the lower end of the stack section 2, equal in length to the distance from the shoulder 9 of the fitting to its lower end, is removed, then, a centering and packing ring 12, as shown in Figures 2 and 3, is slipped upwardly over the end of the section 2 from which the piece has been removed. This ring preferably would be of metal and is of a size that will fit closely about the pipe 2. Its outside diameter is just slightly less than the inside diameter of the hub 8. The fitting 4 is then inserted, as shown in Figure 3, by applying its hub end over the lower end of the cut section 2 and pushing it upwardly thereon until the lower end of the fitting clears the hub 5 of the section 3 and may be dropped into place.

It will be stated here that fittings of the type generally in use cannot be applied over the end of a section, as shown in Figure 3, for the reason that the lower end of the section 2 cannot be extended into the fitting past the shoulder of the hub, but in the present construction this has been made possible by enlarging the upper end of the fitting opening, between the points 10—10, as previously stated. After the fitting has been inserted, the ring 12 is then moved downwardly on the pipe 2 into the hub 8 and by centering the pipe 2 within the hub causes the lower end of the pipe to be seated on the wide portion of shoulder 9, which then serves as a support for the upper part of the stack. The joints are then properly calked and sealed.

The advantages of this type of fitting over the type ordinarily used is readily apparent, since the usual practice would be to remove a piece of the section 2 equal in length to the length of the fitting to be inserted, then to apply the lower end of the fitting within the hub of the section 3, then raise the fitting so that the hub at its upper end would inclose the lower end of the section 2. It is apparent that this old method does not provide any support for the lower end of the fitting or for the lower end of the upper portion of the stack except that which is afforded by the lead joints, while in my construction the weight of the stack is supported by the fitting and not by the lead calking.

It is intended to make fittings of this type either in straight T and Y forms or in other forms desirable. Such could be made in various sizes, for large or small stacks and could be used for other purposes, otherwise than herein described, without departing from the spirit of the invention.

Having thus described my invention, what I claim as new therein and desire to secure by Letters-Patent, is:

1. The combination stack sections of the class described, of a fitting adapted for insertion within the stack; said fitting having an opening at its upper end of sufficient diameter to permit the fitting to be slipped over the end of the section to which it is to be joined and having a hub formed eccentric with respect to said opening to provide a shoulder on which the lower end of a stack section will seat when centered within the hub.

2. The combination with a stack comprising sections of the class described of a fitting adapted for insertion within the stack; said fitting having a lower end portion adapted to fit within a hub portion of a section of the stack and increased in diameter toward its upper end in order to permit it to be applied over the lower end of a stack section, and having a hub formed on its upper end eccentric with the upper end of the opening, thereby forming an eccentric shoulder on which the lower end of a stack section may rest when centered in the hub.

3. In combination, a stack comprising a section having a hub at its upper end, and a second section alined with the first section of a fitting having a lower end portion adapted to be fitted within said hub of the first section and having an enlarged upper end portion which will permit said fitting to be slipped upwardly on the second section, a hub formed eccentrically with respect to the upper end opening and forming an annular eccentric shoulder on which the end of said second section may seat when centered in the hub and a centering enclosing the end of the second section and fitted within the hub.

Signed at Seattle, King County, Washington this 16th day of March 1923.

DANIEL W. GUILES.